US010318851B2

(12) United States Patent
Feng

(10) Patent No.: US 10,318,851 B2
(45) Date of Patent: Jun. 11, 2019

(54) GENERATING AND DECODING TWO-DIMENSIONAL CODE

(71) Applicant: Alibaba Group Holding Limited, Grand Cayman (KY)

(72) Inventor: Xiahong Feng, Hangzhou (CN)

(73) Assignee: Alibaba Group Holding Limited

( * ) Notice: Subject to any disclaimer, the term of this patent is extended or adjusted under 35 U.S.C. 154(b) by 68 days.

(21) Appl. No.: 15/261,258

(22) Filed: Sep. 9, 2016

(65) Prior Publication Data

US 2017/0076191 A1 Mar. 16, 2017

(30) Foreign Application Priority Data

Sep. 10, 2015 (CN) .......................... 2015 1 0572367

(51) Int. Cl.
G06K 7/10 (2006.01)
G06K 19/06 (2006.01)
G06K 7/14 (2006.01)

(52) U.S. Cl.
CPC ....... *G06K 19/0614* (2013.01); *G06K 7/1417* (2013.01); *G06K 19/06037* (2013.01)

(58) Field of Classification Search
CPC ........... G06K 7/1417; G06K 19/06037; G06K 19/0614
See application file for complete search history.

(56) References Cited

U.S. PATENT DOCUMENTS

| 7,032,823 B2 | 4/2006 | Nojiri |
| 2005/0269416 A1 | 12/2005 | Sussmeier et al. |
| 2008/0048044 A1 | 2/2008 | Zhao et al. |
| 2009/0308927 A1 | 12/2009 | Longacre, Jr. et al. |
| 2011/0298078 A1 | 12/2011 | Sun et al. |
| 2012/0327450 A1 | 12/2012 | Sagan et al. |
| 2013/0092738 A1 | 4/2013 | Blasinski et al. |
| 2015/0108220 A1 | 4/2015 | Gu et al. |

FOREIGN PATENT DOCUMENTS

WO     WO0165468     9/2001

OTHER PUBLICATIONS

PCT Search Report and Written Opinion dated Feb. 3, 2017 for PCT Application No. PCT/US16/50990, 11 pages.
PCT Invitation to Pay Additional Fees dated Nov. 21, 2016 for PCT Application No. PCT/US16/50990, 2 pages.

*Primary Examiner* — Thien M Le
*Assistant Examiner* — April A Taylor
(74) *Attorney, Agent, or Firm* — Lee & Hayes, P.C.

(57) ABSTRACT

A two-dimensional code generation method includes: performing a multiple system barcode encoding on hidden information to generate multiple system barcode of hidden encoded information; selecting a corresponding two-dimensional code version to encode standard information to generate to-be-determined standard encoded information; selecting a corresponding mask to generate a bit matrix of a two-dimensional code, and extracting the number of black dots in the bit matrix; updating the selected mask and the two-dimensional code version according to the number of black dots and the length of the hidden encoded information to determine a finally selected mask and two-dimensional code version; generating standard encoded information according to the finally selected mask and two-dimensional code version; and generating a two-dimensional code according to the hidden encoded information and the standard encoded information.

19 Claims, 8 Drawing Sheets and blank symbols arranged according to a certain encoding rules that represent information formed by certain characters, numerals and symbols. A one-dimensional barcode is briefly referred to as a one-dimensional code, it is series of characters formed by "0" and "1" encoded according to different widths of stripes in the horizontal direction. Such binary characters are encoded according to a certain system convention. The barcode storing information in a two-dimensional space in horizontal and vertical directions is referred to as a two-dimensional barcode (2-dimensional barcode), briefly referred to as a two-dimensional code. It may generally be classified into the following two types in terms of the encoding techniques: a line-arrangement two-dimensional barcode and a matrix two-dimensional code. The representative line-arrangement two-dimensional codes include Code16K, Code49, PDF417 and the like. The representative matrix two-dimensional barcodes include: Code-One, MaxiCode, QRCode, Data Matrix and the like. The QRCode (QuickResponseCode) is a matrix two-dimensional barcode developed by Denso Company in Japan in September, 1994. It not only has large information capacity and high reliability just like the one-dimensional barcode and other two-dimensional barcodes, but also has advantages such as super-high speed identification degree, comprehensive recognition, Chinese character rendering, high security, anti-forgery, etc.

GENERATING AND DECODING TWO-DIMENSIONAL CODE

CROSS REFERENCE TO RELATED APPLICATION

The present disclosure claims the benefit of Chinese Patent Application Number 201510572367.5 filed Sep. 10, 2015, entitled "Method and Device for Generating and Decoding Two-Dimensional Code," which is hereby incorporated by reference in its entirety.

TECHNICAL FIELD

The present disclosure relates to the field of computer technologies, and, more particularly, to a two-dimensional code generation method and device, as well as a two-dimensional code decoding method and device.

BACKGROUND

At present, commonly used anti-forgery technologies include barcode anti-forgery, two-dimensional code anti-forgery and the like. The barcode is a group of stripes and blank symbols arranged according to a certain encoding rules that represent information formed by certain characters, numerals and symbols. A one-dimensional barcode is briefly referred to as a one-dimensional code, it is series of characters formed by "0" and "1" encoded according to different widths of stripes in the horizontal direction. Such binary characters are encoded according to a certain system convention. The barcode storing information in a two-dimensional space in horizontal and vertical directions is referred to as a two-dimensional barcode (2-dimensional barcode), briefly referred to as a two-dimensional code. It may generally be classified into the following two types in terms of the encoding techniques: a line-arrangement two-dimensional barcode and a matrix two-dimensional code. The representative line-arrangement two-dimensional codes include Code16K, Code49, PDF417 and the like. The representative matrix two-dimensional barcodes include: Code-One, MaxiCode, QRCode, Data Matrix and the like. The QRCode (QuickResponseCode) is a matrix two-dimensional barcode developed by Denso Company in Japan in September, 1994. It not only has large information capacity and high reliability just like the one-dimensional barcode and other two-dimensional barcodes, but also has advantages such as super-high speed identification degree, comprehensive recognition, Chinese character rendering, high security, anti-forgery, etc.

Along with the quick development of network technologies and popularization of e-commerce, there is an increasing number of merchants who want to include more two-dimensional code information in a two-dimensional code picture. The existing two-dimensional code design uses a plurality of (for example, four) colors instead of two colors (black and white) to indicate information, so that the two-dimensional code includes more two-dimensional code information.

However, currently, there exists a problem that two colors are simply increased to a plurality of colors, and no special processing is performed on various color information. In other words, all of the information included in a colorful two-dimensional code generated by using the existing two-dimensional code technology is standard Quick Response Code (QRCODE) information, which does not include any special non-standard QRCODE information (that is, hidden information), such as identity information representative of a two-dimensional code generator, so that the generated two-dimensional code still has no unique effects compared with the traditional two-dimensional code.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present disclosure is to solve the above technical problems. The first objective of the present disclosure is to provide a two-dimensional code generation method. Based on the existing black dots in a QRCODE dot-matrix, the method carries more information by using a plurality of colors (such as red, green, blue and black), and uses public awareness of the QRCODE and hiddenness of multi-color encoded information to distinguish whether a code is generated by the instant method, thereby achieving the effect of uniqueness.

The second objective of the present disclosure is to provide a two-dimensional code generation device. The third objective of the present disclosure is to provide a two-dimensional code decoding method. The fourth objective of the present disclosure is to provide a two-dimensional code decoding device.

To achieve the above objectives, a two-dimensional code generation method according to an example embodiment in the first aspect of the present disclosure includes: performing a multiple system barcode encoding on hidden information to generate multiple system barcode of hidden encoded information; selecting a corresponding two-dimensional code version according to a two-dimensional code version level to encode standard information to generate to-be-determined standard encoded information; selecting a corresponding mask according to the to-be-determined standard encoded information to generate a bit matrix of a two-dimensional code, and extracting the number of black dots in the bit matrix; updating the selected mask and the two-dimensional code version according to the number of black dots in the bit matrix and the length of the hidden encoded information to determine a finally selected mask and two-dimensional code version; generating standard encoded information according to the finally selected mask and two-dimensional code version; and generating the two-dimensional code according to the hidden encoded information and the standard encoded information.

The two-dimensional code generation method according to the embodiment of the present disclosure may perform a multiple system barcode encoding on the hidden information to generate multiple system barcode of hidden encoded information, then select a corresponding two-dimensional code version according to a two-dimensional code version level to encode standard information to generate to-be-determined standard encoded information, and then select a corresponding mask according to the to-be-determined standard encoded information to generate a bit matrix of a two-dimensional code, and extract the number of black dots in the bit matrix, thereafter update the selected mask and the two-dimensional code version according to the number of black dots in the bit matrix and the length of the hidden encoded information to determine a finally selected mask and two-dimensional code version, then generate standard encoded information according to the finally selected mask and two-dimensional code version, and finally generate the two-dimensional code according to the hidden encoded information and the standard encoded information. Based on the conventional black dots in a QRCODE dot-matrix, the above technical solution carries more information by using a plurality of colors (such as red, green, blue and black), and uses public awareness of the QRCODE and hiddenness of multi-color encoded information to distinguish whether a code is generated of the instant methods, thereby achieving the effect of uniqueness.

To achieve the above objectives, a two-dimensional code generation device according to an example embodiment in the second aspect of the present disclosure includes: a first encoding module that performs a multiple system barcode encoding on hidden information to generate multiple system barcode of hidden encoded information; a second encoding module that selects a corresponding two-dimensional code version according to a two-dimensional code version level to encode standard information to generate to-be-determined standard encoded information; a bit matrix generation module that selects a corresponding mask according to the to-be-determined standard encoded information to generate a bit matrix of a two-dimensional code, and extracts the number of black dots in the bit matrix; a determination module that updates the selected mask and the two-dimensional code version according to the number of black dots in the bit matrix and the length of the hidden encoded information to determine a finally selected mask and two-dimensional code version; a standard encoded information generation module that generates standard encoded information according to the finally selected mask and two-dimensional code version; and a two-dimensional code generation module that generates the two-dimensional code according to the hidden encoded information and the standard encoded information.

In the two-dimensional code generation device according to the example embodiment of the present disclosure, the first encoding module performs a multiple system barcode encoding on hidden information to generate multiple system barcode of hidden encoded information, the second encoding module selects a corresponding two-dimensional code version according to a two-dimensional code version level to encode standard information to generate to-be-determined standard encoded information, the bit matrix generation module selects a corresponding mask according to the to-be-determined standard encoded information to generate a bit matrix of a two-dimensional code, and extracts the number of black dots in the bit matrix, the determination module updates the selected mask and the two-dimensional code version according to the number of black dots in the bit matrix and the length of the hidden encoded information to determine a finally selected mask and two-dimensional code version, the standard encoded information generation module generates standard encoded information according to the finally selected mask and two-dimensional code version, and the two-dimensional code generation module generates the two-dimensional code according to the hidden encoded information and the standard encoded information. Based on the conventional black dots in a QRCODE dot-matrix, the above technical solution carries more information by using a plurality of colors (such as red, green, blue and black), and uses public awareness of the QRCODE and hiddenness of multi-color encoded information to distinguish whether a code is generated by the instant device, thereby achieving the effect of uniqueness.

To achieve the above objectives, a two-dimensional code decoding method according to an example embodiment in the third aspect of the present disclosure includes: scanning a two-dimensional code and generating a two-dimensional code image; performing an image processing on the two-dimensional code image, and recording a conversion method parameter and a black-white dot unit segmentation parameter of the two-dimensional code image; decoding the processed two-dimensional code image to generate standard information, and performing a shape correction on the two-dimensional code image according to the conversion method parameter and the black-white dot unit segmentation parameter; performing a code region segmentation on the shape corrected two-dimensional code image according to the conversion method parameter and the black-white dot unit segmentation parameter; performing a white balance correction on the segmented two-dimensional code image, and performing a color-digital conversion on the white balance corrected two-dimensional code image to acquire multiple system barcode of hidden encoded information; and decoding the multiple system barcode of hidden encoded information to generate hidden information.

The two-dimensional code decoding method according to the example embodiment of the present disclosure may scan a colorful two-dimensional code to generate a colorful two-dimensional code image, then perform an image processing on the image, and record processing parameters in the processing, then decode the processed two-dimensional code image to obtain standard information, and perform a shape correction on the two-dimensional code image according to the processing parameters, and perform a code region segmentation on the shape corrected two-dimensional code image according to the processing parameters, then perform a white balance correction on the segmented two-dimensional code image, and perform a color-digital conversion on the white balance corrected two-dimensional code image to acquire multiple system barcode of hidden encoded information, and finally decode the multiple system barcode of hidden encoded information to generate hidden information, thereby obtaining all of the content information, that is, standard information and hidden information, included in the colorful two-dimensional code. The above technical solution may not only identify the standard information included in a standard QRCODE, but also identify the standard information and hidden information included in a colorful QRCODE, which increases the function of the conventional two-dimensional code scanner and extends the scope of application.

To achieve the above objectives, a two-dimensional code decoding device according to an example embodiment in the fourth aspect of the present disclosure includes: a scanning module that scans a two-dimensional code and generating a two-dimensional code image; an image processing module that performs an image processing on the two-dimensional code image, and records a conversion method parameter and a black-white dot unit segmentation parameter of the two-dimensional code image; a generation module that decodes the processed two-dimensional code image to generate standard information; a shape correction module that performs a shape correction on the two-dimensional code image according to the conversion method parameter and the black-white dot unit segmentation parameter; a segmentation module that performs a code region segmentation on the shape corrected two-dimensional code image according to the conversion method parameter and the black-white dot unit segmentation parameter; a white balance correction module that performs a white balance correction on the segmented two-dimensional code image; a conversion module that performs a color-digital conversion on the white balance corrected two-dimensional code image to acquire multiple system barcode of hidden encoded information; and a decoding module that decodes the multiple system barcode of hidden encoded information to generate hidden information.

In the two-dimensional code decoding device according to the example embodiment of the present disclosure, the scanning module scans a colorful two-dimensional code and generates a colorful two-dimensional code image; the image processing module performs an image processing on the image, and records processing parameters in the processing; the generation module decodes the processed two-dimensional code image to obtain standard information; the shape correction module performs a shape correction on the two-dimensional code image according to the processing parameters; the segmentation module performs a code region segmentation on the shape corrected two-dimensional code image according to the processing parameters; the white balance correction module performs a white balance correction on the segmented two-dimensional code image; the conversion module performs a color-digital conversion on the white balance corrected two-dimensional code image to acquire multiple system barcode of hidden encoded information; and the decoding module decodes the multiple system barcode of hidden encoded information to generate hidden information, thereby obtaining all of the content information, that is, standard information and hidden information, included in the colorful two-dimensional code. The above technical solution may not only identify the standard information included in a standard QRCODE, but also can identify the standard information and hidden information included in a colorful QRCODE, which increases the function of the conventional two-dimensional code scanner and extends the scope of application.

Additional aspects and advantages of the present disclosure will be set forth in the following description, will be obvious from the description, or may be learned by practice of the present disclosure.

BRIEF DESCRIPTION OF THE DRAWINGS

The above and additional aspects and advantages of the present disclosure will become apparent and easily understood from the following description of the example embodiment with the accompanying drawings.

DETAILED DESCRIPTION

Figure 1:
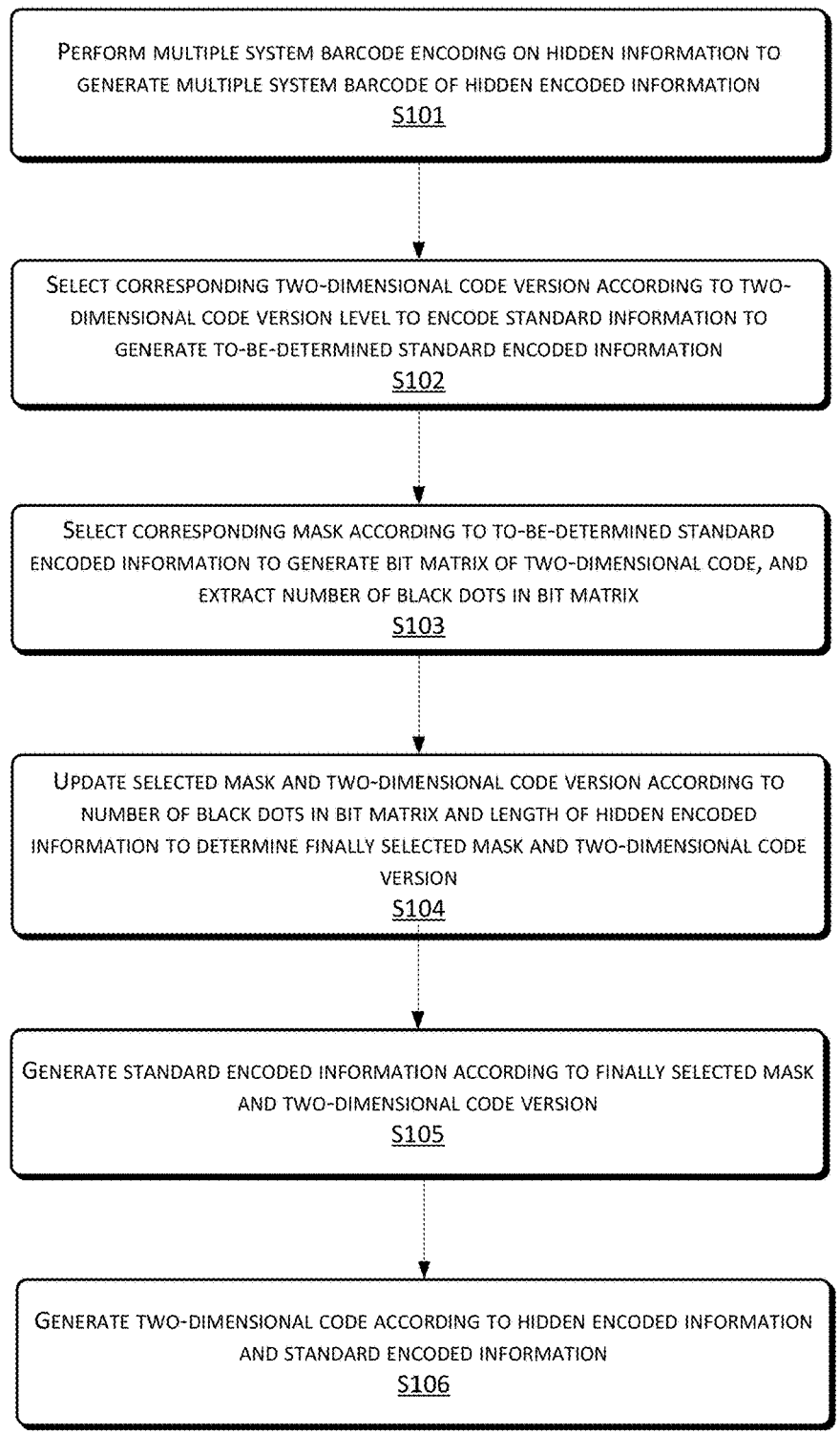
FIG. 1 is a flow chart of a two-dimensional code generation method according to an example embodiment of the present disclosure.

The example embodiments of the present disclosure are specifically described as follows, and the examples are illustrated in the drawings, wherein the same or similar numeral represents the same or similar elements or elements having the same or similar functions. The following example embodiments described by drawings are examples and are used to illustrate the present disclosure, and shall not be construed to limit the present disclosure.

A two-dimensional code generation method and device as well as a two-dimensional code decoding method and device according to the example embodiments of the present disclosure are described in the following with reference to the accompanying drawings.

FIG. 1 is a flow chart of a two-dimensional code generation method according to an example embodiment of the present disclosure. As shown in FIG. 1, the two-dimensional code generation method may include:

S101: multiple system barcode encoding is performed on hidden information to generate multiple system barcode of hidden encoded information.

For example, in the example embodiment of the present disclosure, the hidden information may be understood as non-QRCODE (matrix two-dimensional code) standard information, that is, information having a special meaning (such as personal information and merchant information), and the content of the encoded hidden information is identified by using a dedicated scanner.

In the example embodiment of the present disclosure, each bit of the multiple system barcode of hidden encoded information corresponds to a color. Moreover, in the example embodiment of the present disclosure, the multiple system barcode hidden encoding may be quaternary hidden encoding.

For example, in case of quaternary hidden encoding, it is feasible to perform the quaternary hidden encoding on the hidden information to obtain quaternary hidden encoded information, such as quaternary IntArray (that is, a bit stream array formed by a group of values in the range of 0-3) and the length L0 of the quaternary IntArray (that is, the length of the hidden encoded information). It is understandable that in this example embodiment, the encoding algorithm for encoding the hidden information is not limited to a certain encoding algorithm, which may be the encoding of QRCODE data, such as RS encoding (that is, Read-Solomon encoding) and the like or other encoding algorithms, which is not specifically limited here.

S102: A corresponding two-dimensional code version is selected according to a two-dimensional code version level to encode standard information to generate to-be-determined standard encoded information.

In the example embodiment of the present disclosure, the two-dimensional code may be a QRCODE.

For example, information length of the standard information may be acquired first, then a corresponding QRCODE version is selected from the two-dimensional code version level according to the information length. Then, the standard information is encoded according to the corresponding QRCODE version to obtain to-be-determined standard encoded information. In the example embodiment of the present disclosure, the standard information may be understood as standard QRCODE information. It can be understood that, the two-dimensional code version level has a plurality of QRCODE versions that differ in version priorities.

S103: A corresponding mask is selected according to the to-be-determined standard encoded information to generate a bit matrix of the two-dimensional code, and the number of black dots in the bit matrix is extracted.

For example, when the bit matrix of the QRCODE two-dimensional code is generated, in order to distribute black and white dots in the bit matrix uniformly to provide the generated QRCODE with better robustness, the black and white dot-matrix may be scattered. That is, the to-be-determined standard encoded information may be encoded by using the mask to obtain a scattered black and white dot-matrix, that is, the bit matrix. It can be understood that, in the example embodiment of the present disclosure, the mask may have different priorities. That is, in the process of generating the bit matrix of the two-dimensional code, corresponding selection may be made from masks with 8 different priorities.

For example, in the embodiment of the present disclosure, the priority of the mask may be determined according to the to-be-determined standard encoded information. Then, the corresponding mask may be determined according to the priority of the mask, and the bit matrix of the two-dimensional code is generated according to the corresponding mask. Finally, the number L1 of black dots in the bit matrix may be extracted. Wherein, the bit matrix of the two-dimensional code is a matrix data set formed by one-dimensional and two-dimensional 1 (true) or 0 (false). Moreover, it can be understood that, the number of black dots does not include locator black dots in the bit matrix.

S104: The selected mask and the two-dimensional code version are updated according to the number of black dots in the bit matrix and the length of the hidden encoded information to determine a finally selected mask and two-dimensional code version.

For example, in the example embodiment of the present disclosure, it is feasible to determine whether the length L0 of the hidden encoded information is less than the number L1 of black dots in the bit matrix. If the length L0 of the hidden encoded information is greater than the number L1 of black dots in the bit matrix, it is feasible to select a mask with the next lower priority, and generate a bit matrix of the two-dimensional code according to the mask with the next lower priority, and extract the number of black dots in the bit matrix, and compare the number of black dots in the bit matrix with the length of the hidden encoded information. Such operations are performed until the length of the hidden encoded information is less than the number of black dots in the bit matrix. At this point, it is feasible to use the current mask as the finally selected mask, and use the current two-dimensional code version as the finally selected two-dimensional code version. If the length L0 of the hidden encoded information is less than the number L1 of black dots in the bit matrix, at this point, it is feasible to use the current mask as the finally selected mask, and use the current two-dimensional code version as the finally selected two-dimensional code version.

Further, in the example embodiment of the present disclosure, if the length L0 of the hidden encoded information is still greater than the number L1 of black dots in the bit matrix after the priority of the mask reaches the lowest priority, a two-dimensional code version of a next higher level may be selected, and the steps S102 to S104 will be executed again till the length L0 of the hidden encoded information is less than the number L1 of black dots in the bit matrix. At this point, the current mask may be used as the finally selected mask, and the current two-dimensional code version may be used as the finally selected two-dimensional code version.

Therefore, by selecting the optimal mask and the optimal two-dimensional code version, the number of black dots of the standard QRCODE is able to store the hidden encoded information.

S105: Standard encoded information is generated according to the finally selected mask and two-dimensional code version.

For example, the to-be-determined standard encoded information is encoded according to the finally selected mask and two-dimensional code version to obtain the standard encoded information.

S106: The two-dimensional code is generated according to the hidden encoded information and the standard encoded information.

For example, in the example embodiment of the present disclosure, it is feasible to acquire decoding auxiliary information, and perform a multiple system barcode encoding on the decoding auxiliary information to generate multiple system barcode of decoding auxiliary information, wherein, the two-dimensional code includes a plurality of locators for drawing the multiple system barcode of decoding auxiliary information. Then, a data storage area of the two-dimensional code is drawn according to the hidden encoded information and the standard encoded information. Moreover, the decoding auxiliary information may include encoding version information, correction level, encoding algorithm and the like used in encoding the hidden information.

For example, in the example embodiment of the present disclosure, a specific implementation of drawing the data storage area of the two-dimensional code according to the hidden encoded information and the standard encoded information may be as follows: starting to draw the standard encoded information from the lower left corner of the data storage area; successively retrieving a bit value from the hidden encoded information for filling when encountering a black dot; and randomly selecting a color from the plurality of colors corresponding to the multiple system barcode of hidden encoded information to fill the black dot when all the values in the hidden encoded information have been retrieved. Such operations are performed until finishing drawing of the data storage area.

Figure 2:
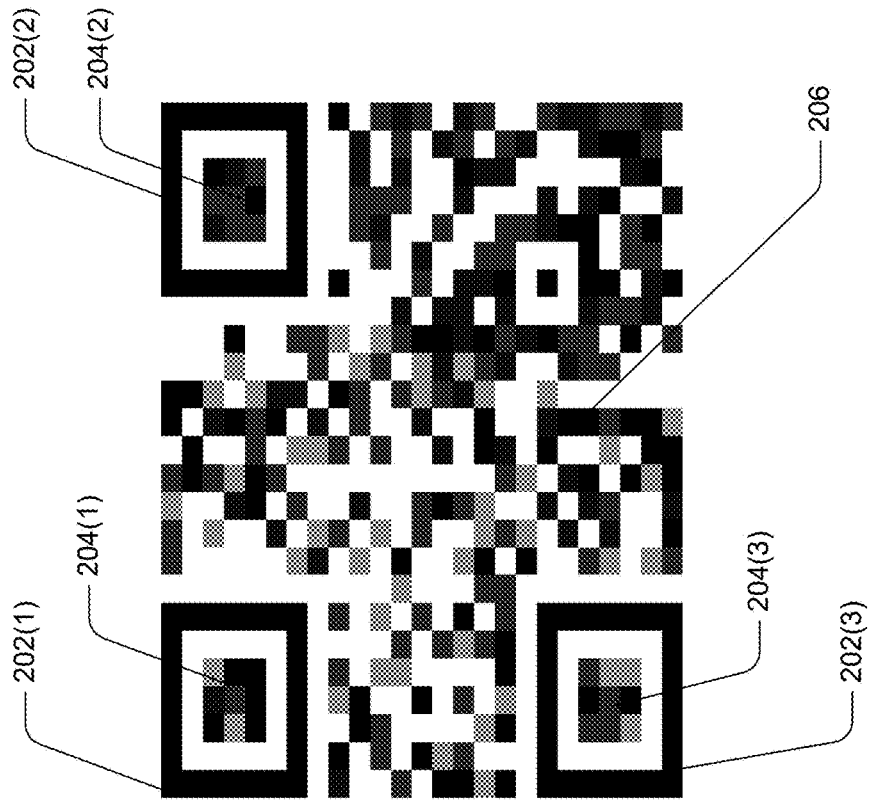
FIG. 2 is a schematic diagram of information distribution of drawing a colorful two-dimensional code according to an example embodiment of the present disclosure.

For example, if the multiple system barcode hidden encoding is quaternary hidden encoding, the bits in the quaternary hidden encoded information may be formed by values in the range of 0-3. Colors corresponding to 0-3 may be red (R), green (G), blue (B) and black (K) respectively (which, understandably, may be other colors, and will not be limited to the above four colors). The process of drawing according to the hidden encoded information and the standard encoded information to generate the colorful two-dimensional code may be as follows: as shown in FIG. 2, each of the 3 locators A 202(1), 202(2), and 202(3) includes 9 middle points represented by 204(1), 204(2), 204(3) respectively. The 9 middle points, i.e., 204(1), 204(2), and 204(3), in the two-dimensional code may be used to draw, by using four colors (red, green, blue and black, that is, quaternary), decoding auxiliary information, such as version information, correction level and algorithm for encoding the hidden information data. 24 black dots at outer frames of the 3 locators A, i.e., 202(1), 202(2), and 202(3), are reserved bits, that is, which are not drawn in the above four colors (it can be understood that the QRCODE itself is in black). The 3 locators A, i.e., 202(1), 202(2), and 202(3), have three redundancies for three copies of data used for fault tolerance. An area 206, i.e., the area in the QRCODE outside the 3 locators A 202(1), 202(2), 202(3), is the actual area to draw the QRCODE in four colors.

Then, the QRCODE standard encoded information is drawn starting from the lower left corner of the data storage area of the two-dimensional code. When a black dot is encountered, a bit value is successively retrieved from the hidden encoded information and a color corresponding to the bit value is used to draw the dot-matrix of the QRCODE, until all the values in the hidden encoded information are retrieved. If all the values in the hidden encoded information are retrieved but the drawing of the QRCODE is not finished yet, a color is selected randomly from a plurality of colors corresponding to the multiple system barcode of hidden encoded information to fill the black dot of the QRCODE, until the drawing the data storage area is finished. It can be understood that, as shown in FIG. 2, the data drawing area of the hidden encoded information does not include blank in the data storage area.

Optionally, in the example embodiment of the present disclosure, the steps S101 and S102 may be executed in any order without distinguishing priority.

The two-dimensional code generation method according to the example embodiment of the present disclosure may perform a multiple system barcode encoding on hidden information to generate multiple system barcode of hidden encoded information, then select a corresponding two-dimensional code version according to a two-dimensional code version level to encode standard information to generate to-be-determined standard encoded information, then select a corresponding mask according to the to-be-determined standard encoded information to generate a bit matrix of a two-dimensional code, and extract the number of black dots in the bit matrix, thereafter update the selected mask and the two-dimensional code version according to the number of black dots in the bit matrix and the length of the hidden encoded information to determine a finally selected mask and two-dimensional code version, then generate standard encoded information according to the finally selected mask and two-dimensional code version, and finally generate the two-dimensional code according to the hidden encoded information and the standard encoded information. Based on the conventional black dots in a QRCODE dot-matrix, the above technical solution carries more information by using a plurality of colors (such as red, green, blue and black), and uses public awareness of the QRCODE and hiddenness of multi-color encoded information to distinguish whether a code is generated by the instant method, thereby achieving the effect of uniqueness.

In order that persons skilled in the art may understand the present disclosure more clearly, the following examples are illustrated.

Figure 3:
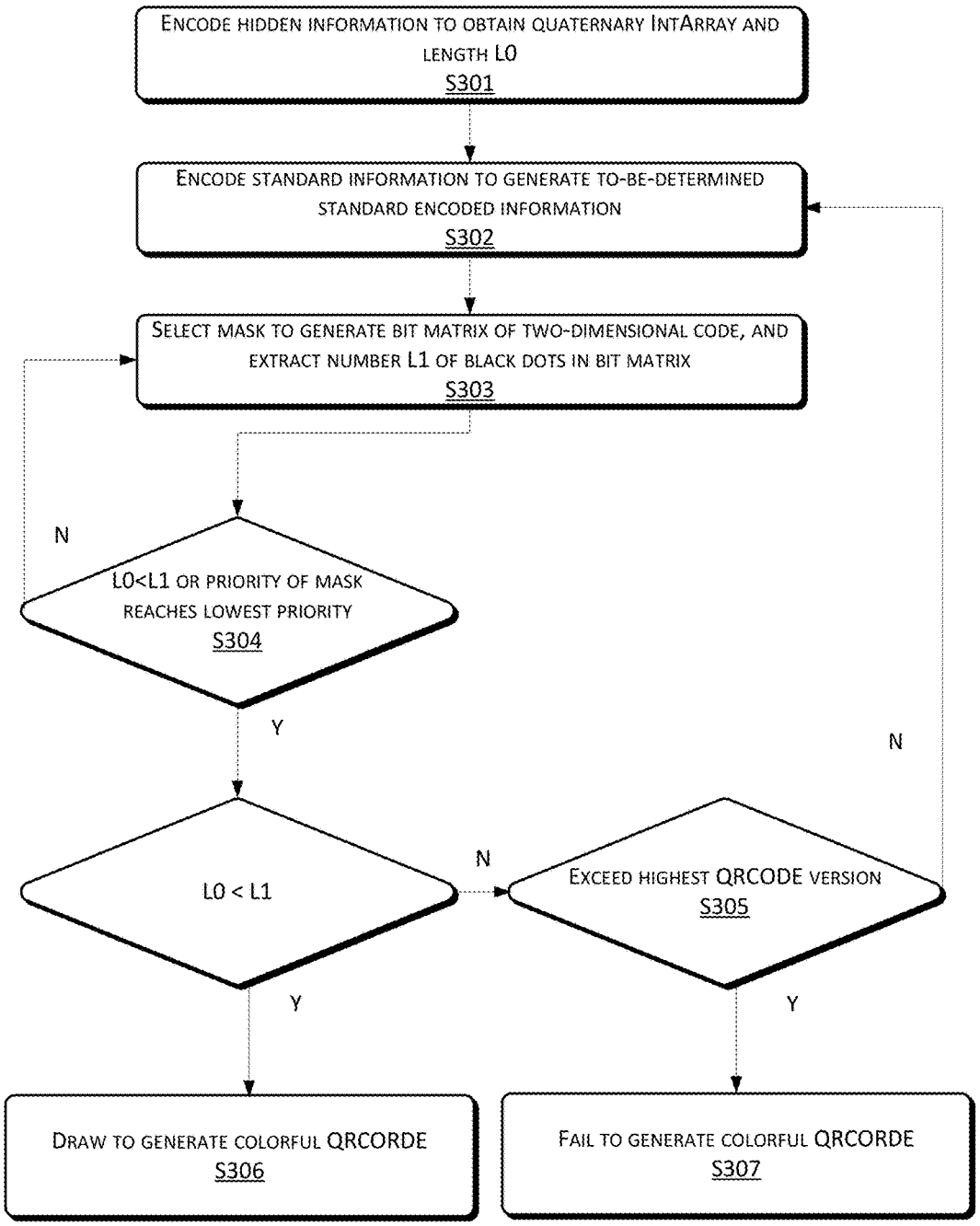
FIG. 3 is a flow chart of a two-dimensional code generation method according to a specific embodiment of the present disclosure.

For example, as shown in FIG. 3, it is feasible to perform a multiple system barcode encoding on hidden information to obtain multiple system barcode of hidden encoded information, such as quaternary hidden information (IntArray) and the length (L0) (S301). Then, a corresponding two-dimensional code version is selected from a two-dimensional code version level according to the information length of the standard information, and standard information is encoded according to the two-dimensional code version to generate to-be-determined standard encoded information (S302). Then, a corresponding mask (Mask) may be selected according to the to-be-determined standard encoded information to generate a QRCODE bit matrix (BitMatrix) and obtain the number of black dots (not including locator black dots) (L1) in the BitMatrix (S303). Then, the length of the hidden encoded information L0 is compared with the number L1 of black dots in the BitMatrix to determine whether the length of L0 is less than L1 (S304). If L0 is greater than L1, the S303 will be repeated to select a Mask with the next lower priority, and continue to compare L0 and L1. If L0 is still greater than L1 after the priority of the Mask reaches the lowest priority, the S302 will be repeated to select a QRCODE version of a next higher level, and the S303 and S304 will be repeated until L0 is less than L1 to enable the number of black dots of the standard QRCODE to store the hidden information (S305). Finally, drawing is performed to generate a colorful QRCODE. For example, 9 middle dots in 3 locators A in the two-dimensional code may be used to draw, by using four colors (red, green, blue and black, that is, quaternary), decoding auxiliary information, such as version information, correction level and algorithm for encoding the hidden information data. 24 black dots at outer frames of the 3 locators A are reserved bits, that is, which are temporarily not used to draw by using the above four colors (for instance, the QRCODE per se is black). The 3 locators A have three redundancies for three copies of data used for fault tolerance. Then, the QRCODE standard encoded information is drawn starting from the lower left corner of the data storage area of the two-dimensional code. When a black dot is encountered, a bit value is successively retrieved from the hidden encoded information and a color corresponding to the bit value is used to draw the dot-matrix of the QRCODE, until all the values in the hidden encoded information are retrieved. If all values in the hidden encoded information are retrieved but the drawing of the QRCODE is not finished yet, a color is selected randomly from a plurality of colors corresponding to the multiple system barcode of hidden encoded information to fill the black dot of the QRCODE, until the drawing of the data storage area is finished (S306). If the priority of mask exceeds the highest QRCODE version at S305, the colorful QRCODE is failed to generate (S307).

To implement the above embodiment, the present disclosure further provides a two-dimensional code generation device.

Figure 4:
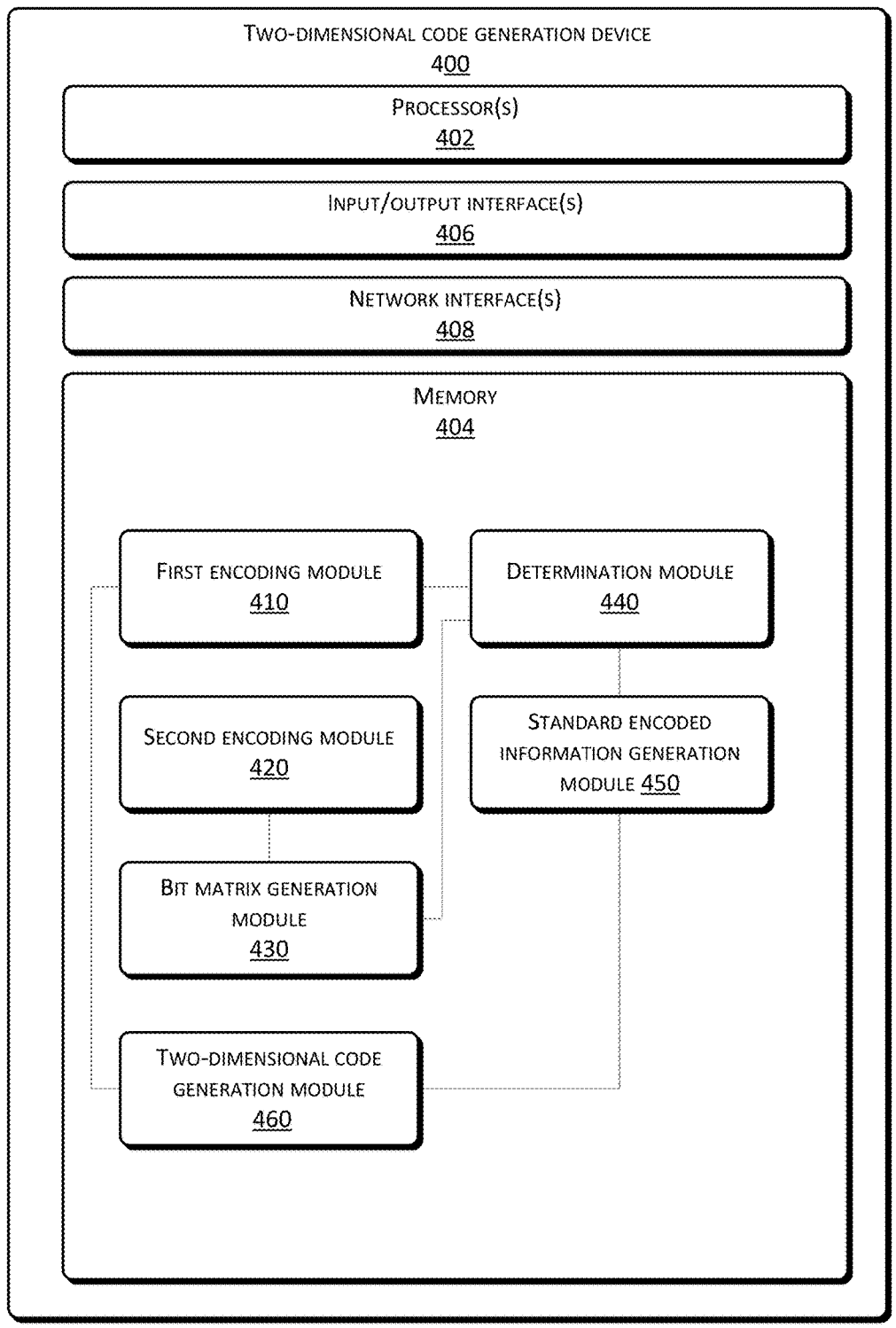
FIG. 4 is a structural diagram of a two-dimensional code generation device according to an example embodiment of the present disclosure.

FIG. 4 is a structural diagram of a two-dimensional code generation device according to an example embodiment of the present disclosure. As shown in FIG. 4, a two-dimensional code generation device 400 includes one or more processor(s) 402 or data processing unit(s) and memory 404. The two-dimensional code generation device 400 may further include one or more input/output interface(s) 406, and network interface(s) 408. The memory 404 is an example of computer readable media.

The memory 404 may store therein a plurality of modules or units including a first encoding module 410, a second encoding module 420, a bit matrix generation module 430, a determination module 440, a standard encoded information generation module 450 and a two-dimensional code generation module 460.

For example, the first encoding module 410 performs a multiple system barcode encoding on hidden information to generate multiple system barcode of hidden encoded information.

For instance, in the example embodiment of the present disclosure, the hidden information may be understood as a non-QRCODE (matrix two-dimensional code) standard information, such as information having a special meaning (such as personal information and merchant information). A dedicated scanner may be used to identify the content of the encoded hidden information.

In the example embodiment of the present disclosure, each bit of the multiple system barcode of hidden encoded information corresponds to a color. Moreover, the multiple system barcode hidden encoding may be quaternary hidden encoding.

For example, in case of the quaternary hidden encoding, the first encoding module 410 may perform the quaternary hidden encoding on the hidden information to obtain quaternary hidden encoded information, such as quaternary IntArray (that is, a bit stream array formed by a group of values in the range of 0-3) and the length L0 of the quaternary IntArray (that is, the length of the hidden encoded information). It is understandable that in this example embodiment, the encoding algorithm for encoding the hidden information is not limited to a certain encoding algorithm, and may be the encoding of QRCODE data, for example, including RS encoding (that is, Read-Solomon encoding) and the like or other encoding algorithms, which is not specifically limited here.

The second encoding module 420 selects a corresponding two-dimensional code version according to a two-dimensional code version level to encode standard information to generate to-be-determined standard encoded information.

For example, in the example embodiment of the present disclosure, the two-dimensional code may be a QRCODE.

More specifically, the second encoding module 420 may acquire information length of the standard information, select a corresponding QRCODE version from the two-dimensional code version level according to the information length, and encode the standard information according to the corresponding QRCODE version to obtain to-be-determined standard encoded information. In the example embodiment of the present disclosure, the standard information may be understood as standard QRCODE information. It can be understood that the two-dimensional code version level has a plurality of QRCODE versions that differ in version priorities.

The bit matrix generation module 430 selects a corresponding mask according to the to-be-determined standard encoded information to generate a bit matrix of the two-dimensional code, and extracts the number of black dots in the bit matrix.

For example, when the bit matrix of the QRCODE two-dimensional code is generated, in order to distribute black and white dots in the bit matrix uniformly to provide the generated QRCODE with better robustness, the black and white dot-matrix may be scattered. That is, the to-be-determined standard encoded information may be encoded by using the mask to obtain a scattered black and white dot-matrix, that is, the bit matrix. For example, in the example embodiment of the present disclosure, the mask may have different priorities, that is, in the process of generating the bit matrix of the two-dimensional code, corresponding selection may be made from masks with 8 different priorities.

For example, in the example embodiment of the present disclosure, the bit matrix generation module 430 may determine the priority of the mask according to the to-be-determined standard encoded information, then generate the corresponding mask according to the priority of the mask, and finally generate the bit matrix of the two-dimensional code according to the corresponding mask, and extract the number L1 of black dots in the bit matrix. The bit matrix of the two-dimensional code is a matrix data set formed by one-dimensional and two-dimensional 1 (true) or 0 (false). Moreover, it can be understood that the number of black dots does not include locator black dots in the bit matrix.

The determination module 440 updates the selected mask and the two-dimensional code version according to the number of black dots in the bit matrix and the length of the hidden encoded information to determine a finally selected mask and two-dimensional code version.

Figure 5:
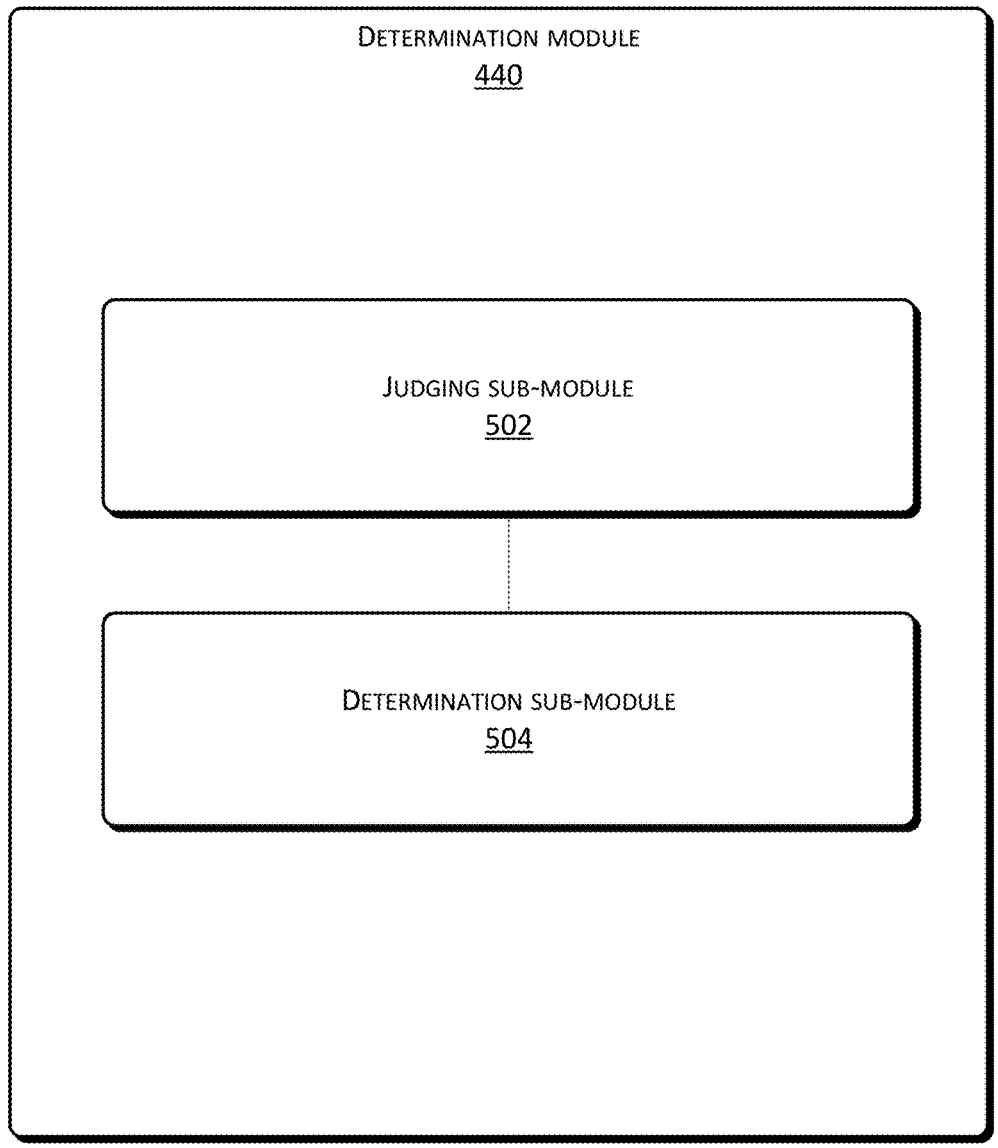
FIG. 5 is a structural block diagram of a determination module according to an example embodiment of the present disclosure.

For example, in an example embodiment of the present disclosure, as shown in FIG. 5, the determination module 440 may include: a judging sub-module 502 and a determination sub-module 504. The judging sub-module 502 judges whether the length of the hidden encoded information is less than the number of black dots in the bit matrix. The determination sub-module 504, when the length of the hidden encoded information is greater than the number of black dots in the bit matrix, selects a mask with the next lower priority, and further compares whether the length of the hidden encoded information is less than the number of black dots in the bit matrix according to the selected mask with the next lower priority, until the length of the hidden encoded information is less than the number of black dots in the bit matrix, and uses the current mask as the finally selected mask and the current two-dimensional code version as the finally selected two-dimensional code version. When the length of the hidden encoded information is less than the number of black dots in the bit matrix, the determination sub-module 504 uses the current mask as the finally selected mask, and the current two-dimensional code version as the finally selected two-dimensional code version.

Further, in the example embodiment of the present disclosure, the determination sub-module 504 may further, when the length of the hidden encoded information is still greater than the number of black dots in the bit matrix after the priority of the mask reaches the lowest priority, select a two-dimensional code version of a higher level, and compare again whether the length of the hidden encoded information is less than the number of black dots in the bit matrix until the length of the hidden encoded information is less than the number of black dots in the bit matrix, and at this point, use the current mask as the finally selected mask and the current two-dimensional code version as the finally selected two-dimensional code version.

Therefore, by selecting the optimal mask and the optimal two-dimensional code version, the number of black dots of the standard QRCODE is able to store the hidden encoded information.

The standard encoded information generation module 450 generates standard encoded information according to the finally selected mask and two-dimensional code version. More specifically, the standard encoded information generation module 450 may encode the to-be-determined standard encoded information according to the finally selected mask and two-dimensional code version to obtain the standard encoded information.

The two-dimensional code generation module 460 generates the two-dimensional code according to the hidden encoded information and the standard encoded information.

Figure 6:
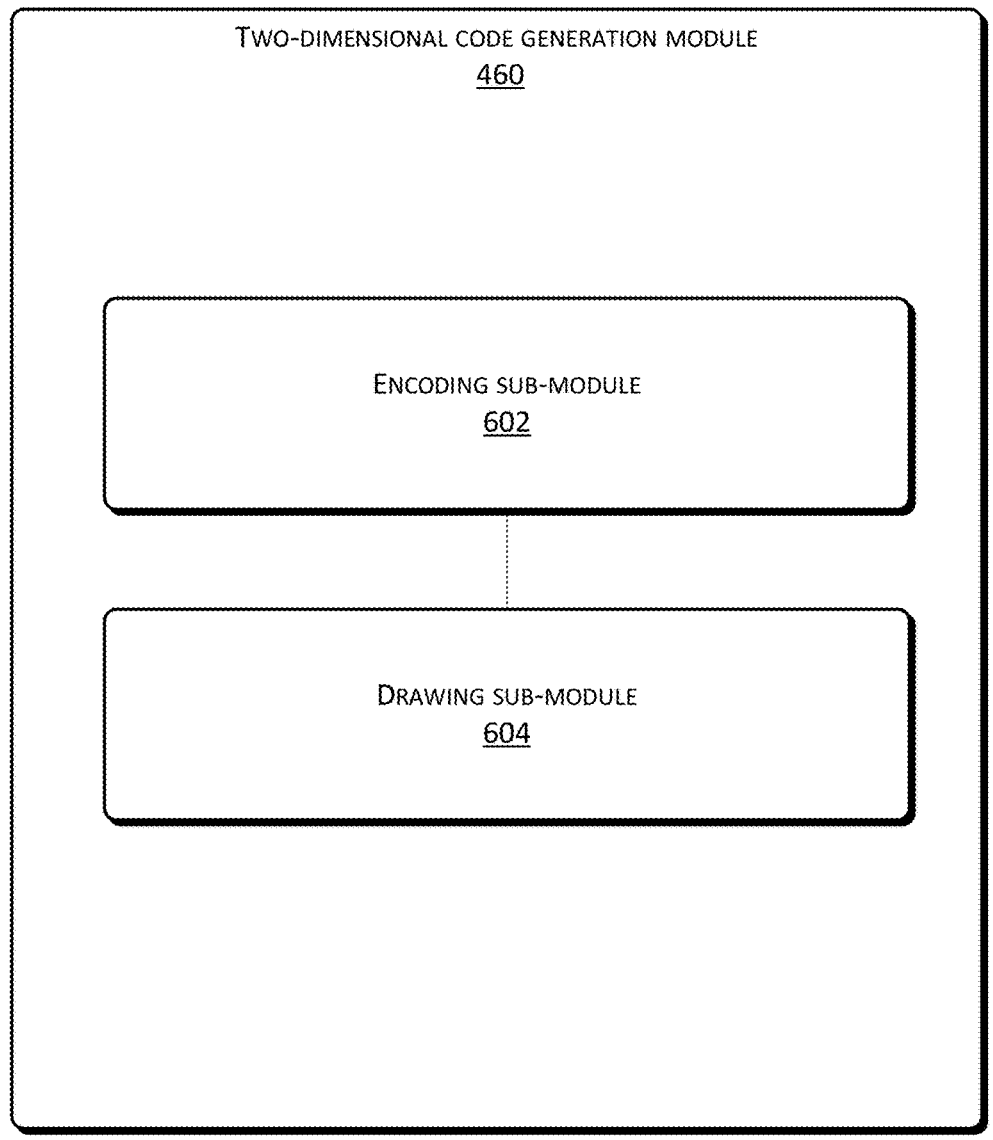
FIG. 6 is a structural diagram of a two-dimensional code generation module according to an example embodiment of the present disclosure.

For example, in an example embodiment of the present disclosure, as shown in FIG. 6, the two-dimensional code generation module 460 may include: an encoding sub-module 602 and a drawing sub-module 604. The encoding sub-module 602 acquires decoding auxiliary information, and performs multiple system barcode encoding on the decoding auxiliary information to generate multiple system barcode of decoding auxiliary information, wherein the two-dimensional code includes a plurality of locators used for drawing the multiple system barcode encryption auxiliary information. The drawing sub-module 604 draws at a data storage area of the two-dimensional code according to the hidden encoded information and the standard encoded information.

In the embodiment of the present disclosure, the specific implementation of the drawing sub-module 604 that draws at the data storage area of the two-dimensional code according to the hidden encoded information and the standard encoded information may be as follows: starting to draw the standard encoded information from the lower left corner of the data storage area; successively retrieving a bit value from the hidden encoded information for filling when encountering a black dot; and randomly selecting a color from the plurality of colors corresponding to the multiple system barcode of hidden encoded information to fill the black dot when all the values in the hidden encoded information have been retrieved, until finishing the drawing of the data storage area.

For example, if the multiple system barcode hidden encoding is quaternary hidden encoding, the bits in the quaternary hidden encoded information may be formed by values in the range of 0-3. Colors corresponding to 0-3 may be red (R), green (G), blue (B) and black (K) respectively (which, understandably, may be other colors, and is not limited to the above four colors). The drawing sub-module 604 draws according to the hidden encoded information and the standard encoded information to generate the colorful two-dimensional code in the following manner: as shown in FIG. 2, 9 middle points in 3 locators A in the two-dimensional code may be used to draw, by using four colors (red, green, blue and black, that is, quaternary), decoding auxiliary information, such as version information, correction level and algorithm for encoding the hidden information data. 24 black dots at outer frames of the 3 locators A are reserved bits, which are temporarily not drawn in the above four colors (it can be understood that the QRCODE per se is black). The 3 locators A have three redundancies for three copies of data used for fault tolerance. Then, the QRCODE standard encoded information is drawn starting from the lower left corner of the data storage area of the two-dimensional code. When a black dot is encountered, a bit value is successively retrieved from the hidden encoded information and a color corresponding to the bit value is used to draw the dot-matrix of the QRCODE, until all the values in the hidden encoded information are retrieved. If all the values in the hidden encoded information are retrieved but the drawing of QRCODE is not finished yet, a color is selected randomly from a plurality of colors corresponding to the multiple system barcode of hidden encoded information to fill the black dot of the QRCODE, until the drawing of the data storage area is finished. It can be understood that, as shown in FIG. 2, the data drawing area of the hidden encoded information does not include blank in the data storage area.

In the two-dimensional code generation device according to the embodiment of the present disclosure, the first encoding module performs a multiple system barcode encoding on hidden information to generate multiple system barcode of hidden encoded information; the second encoding module selects a corresponding two-dimensional code version according to a two-dimensional code version level to encode standard information to generate to-be-determined standard encoded information; the bit matrix generation module selects a corresponding mask according to the to-be-determined standard encoded information to generate a bit matrix of a two-dimensional code, and extracts the number of black dots in the bit matrix; the determination module updates the selected mask and the two-dimensional code version according to the number of black dots in the bit matrix and the length of the hidden encoded information to determine a finally selected mask and two-dimensional code version; the standard encoded information generation module generates standard encoded information according to the finally selected mask and two-dimensional code version; and the two-dimensional code generation module generates the two-dimensional code according to the hidden encoded information and the standard encoded information. Based on the conventional black dots in a QRCODE dot-matrix, the above technical solution carries more information by using a plurality of colors (such as red, green, blue and black), and uses public awareness of the QRCODE and hiddenness of multi-color encoded information to distinguish whether a code is generated by the instant technical solution, thereby achieving the effect of uniqueness.

It should be noted that, information content in the two-dimensional code generated by the two-dimensional code generation method in the example embodiment of the present disclosure includes standard information and hidden information. The standard information part is identifiable by a universal scanner, and the hidden information is identifiable only by using a fixed scanner. Therefore, in order to identify the information content in the two-dimensional code generated by the two-dimensional code generation method according to the example embodiment of the present disclosure, the present disclosure further provides a decoding method for the two-dimensional code.

Figure 7:
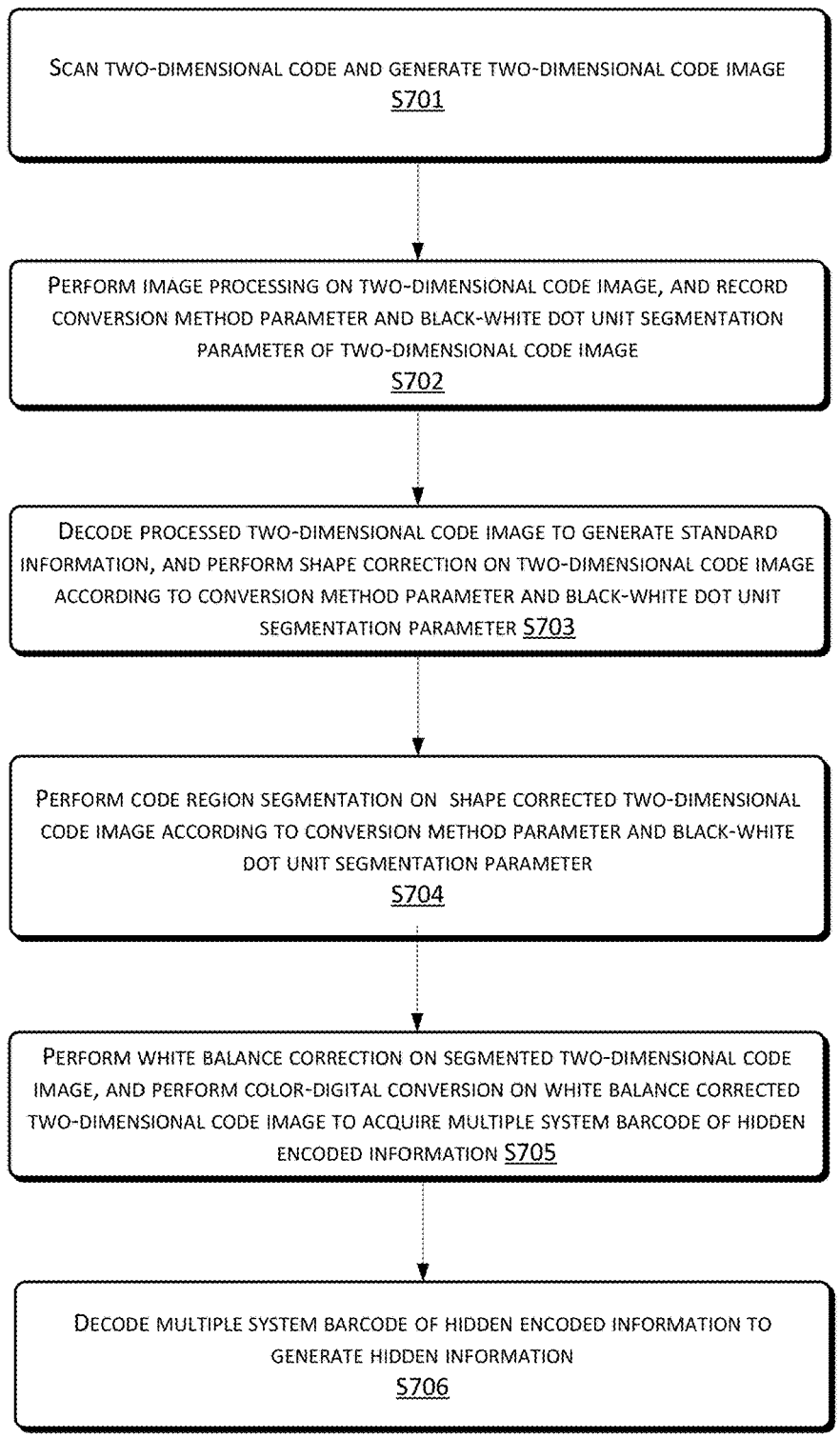
FIG. 7 is a flow chart of a two-dimensional code decoding method according to an example embodiment of the present disclosure.

FIG. 7 is a flow chart of a two-dimensional code decoding method according to an example embodiment of the present disclosure. As shown in FIG. 7, the two-dimensional code decoding method may include:

S701: A two-dimensional code is scanned and a two-dimensional code image is generated.

For example, the two-dimensional code in the embodiment of the present disclosure is a colorful QRCODE two-dimensional code, and information content in the two-dimensional code may be formed by standard information, hidden information and the like.

S702: An image processing is performed on the two-dimensional code image, and a conversion method parameter and a black-white dot unit segmentation parameter of the two-dimensional code image are recorded.

For example, through industry standard techniques, the image processing such as graying and binarization image correction may be performed on the two-dimensional code image, and parameters such as the conversion method parameter and black-white dot unit segmentation parameter of the image may be recorded.

S703: The processed two-dimensional code image is decoded to generate standard information, and a shape correction is performed on the two-dimensional code image according to the conversion method parameter and the black-white dot unit segmentation parameter.

For example, the processed two-dimensional code image may be decoded to obtain the standard information in the information content in the two-dimensional code. Then, when the standard information is successfully read and decoded, a shape correction may be performed on the original image (that is, the two-dimensional code image)

according to the conversion method parameter and the black-white dot unit segmentation parameter and the like.

S704: A code region segmentation is performed on the shape corrected two-dimensional code image according to the conversion method parameter and the black-white dot unit segmentation parameter.

For example, the two-dimensional code region segmentation and unit point segmentation are performed respectively on the shape corrected two-dimensional code image according to the obtained conversion method parameter and the black-white dot unit segmentation parameter.

S705: A white balance correction is performed on the segmented two-dimensional code image, and a color-digital conversion is performed on the white balance corrected two-dimensional code image to acquire multiple system barcode of hidden encoded information.

For example, after the white balance correction is performed on the segmented two-dimensional code image, the color-digital conversion is performed on the two-dimensional code image to acquire multiple system barcode of hidden encoded information corresponding to the two-dimensional code image. For example, the multiple system barcode hidden encoding may be quaternary hidden encoding, and each bit of the multiple system barcode of hidden encoded information corresponds to a color.

S706: The multiple system barcode of hidden encoded information is decoded to generate hidden information.

Therefore, all the information content, that is, standard information and hidden information, included in the colorful two-dimensional code is obtained.

For example, the image processing may be performed on the two-dimensional code image by using a computer language such as C language. The processing efficiency may be improved by using the C language.

In the two-dimensional code decoding method in the example embodiment of the present disclosure, a colorful two-dimensional code may be scanned to generate a colorful two-dimensional code image. An image processing may be performed on the image, and processing parameters in the processing are recorded. The processed two-dimensional code image is decoded to obtain standard information, and a shape correction is performed on the two-dimensional code image according to the processing parameters, and a code region segmentation is performed on the shape corrected two-dimensional code image according to the processing parameters. A white balance correction is performed on the segmented two-dimensional code image, and a color-digital conversion is performed on the white balance corrected two-dimensional code image to acquire multiple system barcode of hidden encoded information. Finally, the multiple system barcode of hidden encoded information is decoded to generate hidden information, thereby obtaining all of the content information, that is, standard information and hidden information, included in the colorful two-dimensional code. The above technical solution identifies not only the standard information included in a standard QRCODE, but also the standard information and hidden information included in a colorful QRCODE, which increases the function of the existing two-dimensional code scanner and extends the scope of application.

To implement the above embodiment, the present disclosure further provides a two-dimensional code decoding device.

Figure 8:
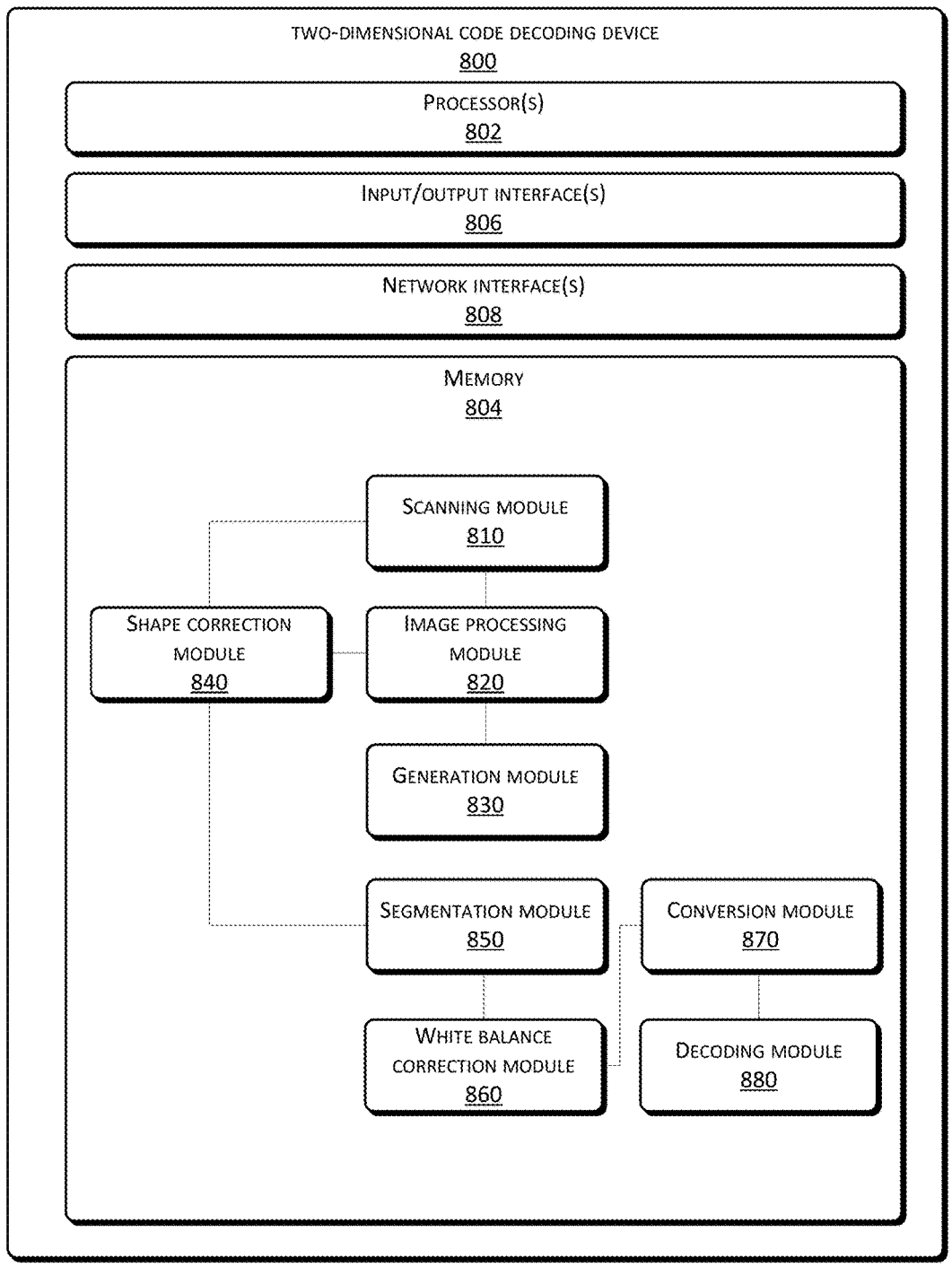
FIG. 8 is a structural diagram of a two-dimensional code decoding device according to an embodiment of the present disclosure.

FIG. 8 is a structural diagram of a two-dimensional code decoding device according to an embodiment of the present disclosure. As shown in FIG. 8, the two-dimensional code decoding device 800 includes one or more processor(s) 802 or data processing unit(s) and memory 804. The two-dimensional code generation device 800 may further include one or more input/output interface(s) 806, and network interface(s) 808. The memory 804 is an example of computer readable media.

The memory 804 may store therein a plurality of modules or units including a scanning module 810, an image processing module 820, a generation module 830, a shape correction module 840, a segmentation module 850, a white balance correction module 860, a conversion module 870 and a decoding module 880.

The scanning module 810 scans a two-dimensional code and generates a two-dimensional code image. For example, the two-dimensional code in the embodiment of the present disclosure is a colorful QRCODE two-dimensional code, and information content in the two-dimensional code is formed by standard information, hidden information, etc.

The image processing module 820 performs an image processing on the two-dimensional code image, and records a conversion method parameter and a black-white dot unit segmentation parameter of the two-dimensional code image. For example, by using the industry standard techniques, the image processing module 820 may perform an image processing such as graying and binarization image correction on the two-dimensional code image, and record parameters such as the conversion method parameter and black-white dot unit segmentation parameter of the image.

The generation module 830 decodes the processed two-dimensional code image to generate standard information.

The shape correction module 840 performs a shape correction on the two-dimensional code image according to the conversion method parameter and the black-white dot unit segmentation parameter. For example, after the generation module 830 decodes the processed two-dimensional code image to obtain the standard information in the information content in the two-dimensional code, when the standard information is successfully read and decoded, the shape correction module 840 performs a shape correction on the original image (that is, the two-dimensional code image) according to the conversion method parameter and the black-white dot unit segmentation parameter and the like.

The segmentation module 850 performs a code region segmentation on the shape corrected two-dimensional code image according to the conversion method parameter and the black-white dot unit segmentation parameter. For example, the segmentation module 850 may perform a two-dimensional code region segmentation and unit point segmentation respectively on the shape corrected two-dimensional code image according to the acquired conversion method parameter and the black-white dot unit segmentation parameter.

The white balance correction module 860 performs a white balance correction on the segmented two-dimensional code image. The conversion module 870 performs a color-digital conversion on the white balance corrected two-dimensional code image to acquire multiple system barcode of hidden encoded information.

For example, after the white balance correction module 860 performs a white balance correction on the segmented two-dimensional code image, the conversion module 870 may perform a color-digital conversion on the two-dimensional code image to acquire multiple system barcode of hidden encoded information corresponding to the two-dimensional code image. For instance, the multiple system barcode hidden encoding may be quaternary hidden encoding, and each bit of the multiple system barcode of hidden encoded information corresponds to a color.

The decoding module 880 decodes the multiple system barcode of hidden encoded information to generate hidden information. Therefore, all of the information content, that is, standard information and hidden information, included in the colorful two-dimensional code is obtained.

In the two-dimensional code decoding device in the embodiment of the present disclosure, the scanning module scans a colorful two-dimensional code and generates a colorful two-dimensional code image; the image processing module performs an image processing on the image, and records processing parameters in the processing; the generation module decodes the processed two-dimensional code image to obtain standard information; the shape correction module performs a shape correction on the two-dimensional code image according to the processing parameters; the segmentation module performs a code region segmentation on the shape corrected two-dimensional code image according to the processing parameters; the white balance correction module performs a white balance correction on the segmented two-dimensional code image; the conversion module performs a color-digital conversion on the white balance corrected two-dimensional code image to acquire multiple system barcode of hidden encoded information; the decoding module decodes the multiple system barcode of hidden encoded information to generate hidden information, thereby obtaining all of the content information, that is, standard information and hidden information, included in the colorful two-dimensional code. The above technical solution identifies not only the standard information included in a standard QRCODE, but also the standard information and hidden information included in a colorful QRCODE, which increases the function of the existing two-dimensional code scanner and extends the scope of application.

Reference throughout this specification to the terms "an embodiment," "some embodiments," "an example," "a specific example," or "some examples," means that a specific feature, structure, material, or characteristic described in connection with the embodiment or example is included in at least one embodiment or example of the present disclosure. The appearances of the phrases throughout this specification are not necessarily referring to the same embodiment or example. Furthermore, the specific features, structures, materials, or characteristics may be combined in any suitable manner in one or more embodiments or examples. In addition, without contradiction, those skilled in the art may combine different embodiments or examples described in the specification and features of different embodiments or examples.

In addition, terms such as "first" and "second" are used only for purposes of description and are not intended to indicate or imply relative importance or to imply the number of indicated technical features. Thus, the feature defined with "first" and "second" may explicitly or implicitly include at least one such feature. In the description of the present disclosure, "a plurality of" refers to at least two, for example, two, three, etc., unless otherwise expressly specified.

The description of any process or method in the flowcharts or in other manners herein may be understood as being indicative of including one or more modules, segments or parts for embodying the codes of executable instructions of the steps in particular logic functions or processes, and that the scope of the preferred embodiments of the present disclosure includes other implementations, where the functions may be executed in sequences different from those shown or discussed, including executing the functions according to the related functions in a substantially simultaneous manner or in a reverse sequence, which should be understood by those skilled in the art to which the embodiments of the present disclosure pertain.

The logic and/or steps shown in the flowcharts or described in other manners here may be, for example, understood as a sequencing list of executable instructions for implementing logic functions, which may be embodied in any computer readable medium, for use by an instruction executing system, device or apparatus (such as a system based on a computer, a system including a processor, or other systems capable of fetching instructions from an instruction executing system, device or apparatus and executing the instructions), or for use in combination with the instruction executing system, device or apparatus.

As used herein, the computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. Furthermore, the computer readable media may be paper or other appropriate media on which the programs or computer readable instructions may be printed, as the programs may be acquired electronically through optically scanning the paper or other appropriate media and then compiling, interpreting, or processing in other appropriate manners, as necessary, and then the programs are stored in the computer memory. According to the definition herein, the computer readable media does not include transitory computer readable media (transitory media), for example, a modulated data signal and a carrier.

It should be understood that each of the parts of the present disclosure may be implemented by hardware, software, firmware, or a combination thereof. In the above example embodiments, multiple steps or methods may be realized by software or firmware that is stored in the memory and executed by an appropriate instruction executing system. For example, if it is realized by hardware, it may be realized by any one of the following technologies known in the art or a combination thereof: a discreet logic circuit having a logic gate circuit for realizing logic functions of data signals, an application-specific integrated circuit having an appropriate combined logic gate circuit, a programmable gate array (PGA), and a field programmable gate array (FPGA), etc.

It would be appreciated by those of ordinary skill in the art that all or some of the steps of the method in the above embodiments may be performed by relevant hardware as instructed by a program. The program may be stored in computer readable media. When the program is run, one or a combination of the steps of the method in the embodiments is performed.

In addition, in the embodiments of the present disclosure, the functional units may be integrated in one processing module, or the functional units may be present separately and physically, or two or more units may be integrated in one module. The above-mentioned integrated module may be implemented in the form of hardware or in the form of a software functional module. If the integrated module is implemented in the form of the software functional module and sold or used as an independent product, the integrated module may also be stored in the computer readable media.

The storage medium mentioned above may be a read-only memory, a magnetic disk or an optical disc. Although the example embodiments of the present disclosure have been shown and described above, it would be appreciated by those of ordinary skill in the art that the above embodiments are examples and shall not be construed to limit the present disclosure, and any changes, modifications, replacements and variations may be made to the example embodiments without departing from the scope of the present disclosure, which shall still fall protection of the present disclosure.

What is claimed is:

1. A two-dimensional code generation method comprising:
    performing a multiple system barcode encoding on hidden information to generate multiple system barcode of hidden encoded information;
    selecting a corresponding two-dimensional code version according to a two-dimensional code version level to encode standard information to generate to-be-determined standard encoded information;
    selecting a corresponding mask among a plurality of masks according to the to-be-determined standard encoded information to generate a bit matrix of the two-dimensional code;
    extracting a number of black dots in the bit matrix;
    updating the selected mask among the plurality of masks and the two-dimensional code version according to whether a length of the hidden encoded information is less than the number of black dots in the bit matrix to determine a finally selected mask and two-dimensional code version;
    generating standard encoded information according to the finally selected mask and two-dimensional code version; and
    generating a two-dimensional code according to the hidden encoded information and the standard encoded information.

2. The two-dimensional code generation method of claim 1, wherein the selecting the corresponding mask according to the to-be-determined standard encoded information to generate the bit matrix of the two-dimensional code includes:
    determining a priority of the mask according to the to-be-determined standard encoded information;
    determining the corresponding mask according to the priority of the mask; and
    generating the bit matrix of the two-dimensional code according to the corresponding mask.

3. The two-dimensional code generation method of claim 2, wherein the updating the selected mask and the two-dimensional code version according to the number of black dots in the bit matrix and the length of the hidden encoded information to determine the finally selected mask and two-dimensional code version includes:
    in response to determining that the length of the hidden encoded information is greater than the number of black dots in the bit matrix,
        selecting a mask with a next lower priority;
        comparing whether the length of the hidden encoded information is less than the number of black dots in the bit matrix according to the selected mask with the next lower priority until the length of the hidden encoded information is less than the number of black dots in the bit matrix;
        using a current mask as the finally selected mask; and
        using a current two-dimensional code version as the finally selected two-dimensional code version.

4. The two-dimensional code generation method of claim 3, wherein in response to determining that the length of the hidden encoded information is greater than the number of black dots in the bit matrix after a priority of the mask reaches a lowest priority, the two-dimensional code generation method further comprises:
    selecting a two-dimensional code version of a next higher level;
    encoding the standard information again according to the two-dimensional code version of the next higher level to generate the to-be-determined standard encoded information; and
    selecting a corresponding mask according to the to-be-determined standard encoded information to generate the bit matrix of the two-dimensional code.

5. The two-dimensional code generation method of claim 1, wherein the updating the selected mask and the two-dimensional code version according to the number of black dots in the bit matrix and the length of the hidden encoded information to determine the finally selected mask and two-dimensional code version includes
    judging whether the length of the hidden encoded information is less than the number of black dots in the bit matrix; and
    in response to determining that the length of the hidden encoded information is less than the number of black dots in the bit matrix,
        using the current mask as the finally selected mask; and
        using the current two-dimensional code version as the finally selected two-dimensional code version.

6. The two-dimensional code generation method of claim 1, wherein each bit of the multiple system barcode of hidden encoded information corresponds to a color.

7. The two-dimensional code generation method of claim 1, wherein the two-dimensional code is a Quick Response Code (QRCODE).

8. The two-dimensional code generation method of claim 1, wherein the multiple system barcode hidden encoding is quaternary hidden encoding.

9. The two-dimensional code generation method of claim 8, wherein the drawing the data storage area of the two-dimensional code according to the hidden encoded information and the standard encoded information includes:
    starting to draw the standard encoded information from a lower left corner of the data storage area; and
    successively retrieving a bit value from the hidden encoded information for filling when encountering a black dot.

10. The two-dimensional code generation of claim 9, wherein the drawing the data storage area of the two-dimensional code according to the hidden encoded information and the standard encoded information includes:
    randomly selecting a color from a plurality of colors corresponding to the multiple system barcode of hidden encoded information to fill the black dot when all the values in the hidden encoded information have been retrieved.

11. The two-dimensional code generation method of claim 1, wherein the generating the two-dimensional code according to the hidden encoded information and the standard encoded information includes:

acquiring decoding auxiliary information;
performing the multiple system barcode encoding on the decoding auxiliary information to generate multiple system barcode of decoding auxiliary information, wherein the two-dimensional code includes a plurality of locators that are used for drawing the multiple system barcode of decoding auxiliary information; and
drawing a data storage area of the two-dimensional code according to the hidden encoded information and the standard encoded information.

12. A two-dimensional code generation device comprising:
one or more processors; and
one or more memories stored thereon computer-executable instructions, executable by the one or more processors, to cause the one or more processors to perform acts comprising:
performing a multiple system barcode encoding on hidden information to generate multiple system barcode of hidden encoded information;
selecting a corresponding two-dimensional code version according to a two-dimensional code version level to encode standard information to generate to-be-determined standard encoded information;
selecting a corresponding mask among a plurality of masks according to the to-be-determined standard encoded information to generate a bit matrix of the two-dimensional code;
extracting a number of black dots in the bit matrix; and
updating the selected mask among the plurality of masks and the two-dimensional code version according to whether a length of the hidden encoded information is less than the number of black dots in the bit matrix to determine a finally selected mask and two-dimensional code version.

13. The two-dimensional code generation device of claim 12, wherein the acts further comprise:
generating standard encoded information according to the finally selected mask and two-dimensional code version; and
generating a two-dimensional code according to the hidden encoded information and the standard encoded information.

14. The two-dimensional code generation device of claim 12, wherein the generating the two-dimensional code according to the hidden encoded information and the standard encoded information includes:
acquiring decoding auxiliary information;
performing the multiple system barcode encoding on the decoding auxiliary information to generate multiple system barcode of decoding auxiliary information, wherein the two-dimensional code includes a plurality of locators that are used for drawing the multiple system barcode of decoding auxiliary information; and
drawing a data storage area of the two-dimensional code according to the hidden encoded information and the standard encoded information.

15. The two-dimensional code generation device of claim 14, wherein the drawing the data storage area of the two-dimensional code according to the hidden encoded information and the standard encoded information includes:
starting to draw the standard encoded information from a lower left corner of the data storage area; and
successively retrieving a bit value from the hidden encoded information for filling when encountering a black dot.

16. The two-dimensional code generation device of claim 12, wherein the selecting the corresponding mask according to the to-be-determined standard encoded information to generate the bit matrix of the two-dimensional code includes:
determining a priority of the mask according to the to-be-determined standard encoded information;
determining the corresponding mask according to the priority of the mask; and
generating the bit matrix of the two-dimensional code according to the corresponding mask.

17. The two-dimensional code generation device of claim 12, wherein each bit of the multiple system barcode of hidden encoded information corresponds to a color.

18. The two-dimensional code generation device of claim 12, wherein the two-dimensional code is a Quick Response Code (QRCODE).

19. The two-dimensional code generation device of claim 12, wherein the multiple system barcode hidden encoding is quaternary hidden encoding.

* * * * *